A. MACQUEEN, Jr.

Lamp Stove.

No. 87,574.

Patented March 9, 1869.

Witnesses
Phil. F. Larner
Geo. W. Rothwell

Inventor
Alfred Macqueen Jr.
By Niedersheim & Co.
Attorneys

ALFRED MACQUEEN, JR., OF PHILADELPHIA, PENNSYLVANIA.

Letters Patent No. 87,574, dated March 9, 1869.

IMPROVEMENT IN DINNER-PAILS.

The Schedule referred to in these Letters Patent and making part of the same.

*To all whom it may concern:*

Be it known that I, ALFRED MACQUEEN, Jr., of the city and county of Philadelphia, and State of Pennsylvania, have invented a new and useful Improvement in Dinner-Pails, or Kettles; and I do hereby declare that the following is a full, clear, and exact description thereof, sufficient to enable others skilled in the art to which my invention appertains, to make and use the same, reference being had to the accompanying drawings, in which—

Similar letters indicate corresponding parts in the several figures.

Figure 1:
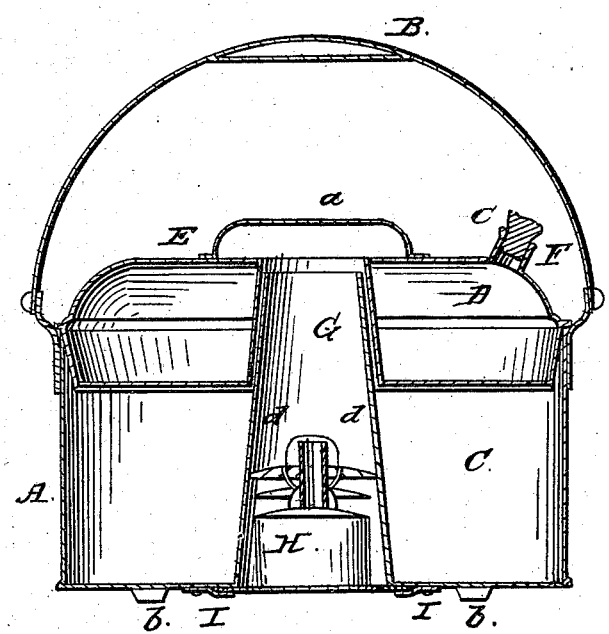
Figure 1 is a central longitudinal section of the device illustrating my invention.
Figure 2:
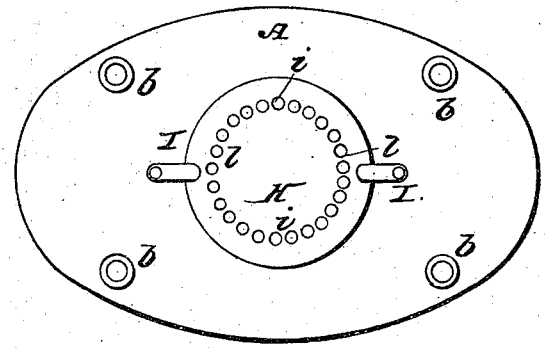
Figure 2 is a bottom view thereof.

My invention consists of a dinner-pail, or kettle, in which the lid, cover, or top is adapted as a receptacle for fluids, such as coffee, tea, and the like, and serves as a warming and drinking-vessel.

A flue, or chimney is located centrally in the pail, or kettle, and extends vertically therethrough, from top to bottom, and is open at both ends.

In this flue is placed a lamp, or other heating-device, so that the body of the kettle and its lid may be heated, and thus warm the articles of food or drink placed therein.

In the drawings—

A represents a pail, or kettle, and

B, the bail, or handle thereof, which are of ordinary form and construction.

C is the body of the kettle, and

D, its cover or lid.

This cover or lid is constructed hollow, and forms a receptacle, or vessel. It extends partly into the body C, yet presents the appearance of an ordinary lid.

It is provided with a spout, F, which admits of the induction and eduction of fluids, and serves as a mouth-piece in drinking from said receptacle.

A suitable handle, $a$, is secured to the lid, for evident purposes.

A stopper, or plug, is inserted into the spout F, to prevent the entrance of air into the receptacle, as well as to retain the fluid therein.

An opening is made in the bottom of the body, and from or about the edges of the opening there rises a tube, G, which is open at both ends, and may be of cylindrical, conical, or other form.

The tube forms a chimney, or flue, and extends to about the height of the upper side of the lid E, as clearly seen in fig. 1.

An opening is also made in the top and bottom of the cover or lid E, and a tube connects said top and bottom, so as to leave a tubular opening in the cover, yet not expose the interior thereof.

The upper end of flue G projects into the opening in the cover, which latter should correspond in shape to the former, yet be a little larger, so as to encircle it.

H represents a lamp, or heating-device, which is secured within the chimney G.

In the present case, I attach a plate underneath the lamp, and retain the latter in position by buttons I, which are pivoted to the bottom of the body C.

A series of holes, $i$, is made in the plate, for admission of the proper degree of air to the flame.

Feet, $b$, may be applied to the pail in any suitable manner.

It will be seen that the workman, traveller, or others, who desire to carry their food with them, can have the food prepared at home, or place of starting, and readily warm it at any time, with convenience and certainty.

The lid is intended for fluids, and the body for solid articles, or whatever the owner may elect.

A series of shelves may be arranged within the body, as desirable.

Having thus described my invention,

What I claim as new, and desire to secure by Letters Patent, is—

The lid D E, forming an entirely closed receptacle, and having spout F, and a central opening, in combination with the pail A and its chimney G, which extends through the body of the pail and the central opening of the receptacle-lid, substantially as and for the purpose described.

To the above, I have signed my name, this 23d day of January, 1869.

ALFRED MACQUEEN, Jr.

Witnesses:
WM. A. WIEDERSHEIM,
H. M. WIEDERSHEIM.